(No Model.)
O. NICHOLS.
APPARATUS FOR MAKING PASTE.
No. 331,647. Patented Dec. 1, 1885.
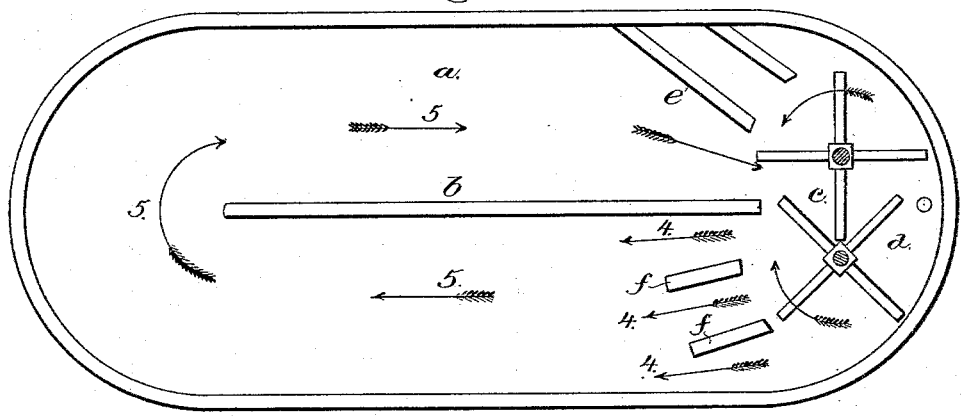
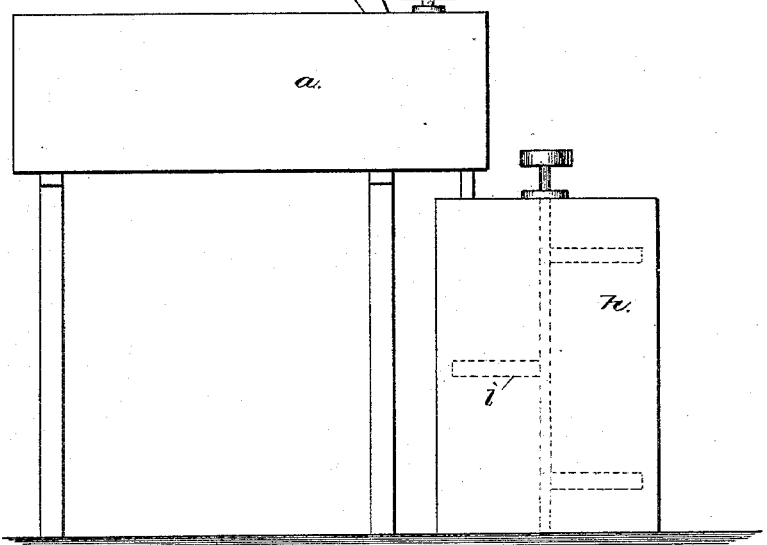
Witnesses:
John F. C. Printlerk
Henry March
Inventor:
Odin Nichols.
by Crosby & Gregory
attys.
N. PETERS, Photo-Lithographer, Washington, D. C.

UNITED STATES PATENT OFFICE.

OLDIN NICHOLS, OF BOSTON, MASSACHUSETTS.

APPARATUS FOR MAKING PASTE.

SPECIFICATION forming part of Letters Patent No. 331,647, dated December 1, 1885.

Application filed June 9, 1884. Serial No. 134,322. (No model.)

*To all whom it may concern:*

Be it known that I, OLDIN NICHOLS, of Boston, (Somerville,) county of Middlesex, State of Massachusetts, have invented an Improvement in Apparatus for Making Paste, of which the following description, in connection with the accompanying drawings, is a specification, like letters on the drawings representing like parts.

My invention relates to an apparatus for making paste composed mainly of flour; and it consists chiefly in grinding the flour in cold water by subjecting it to the action of a stirrer or agitator and producing currents in the liquid, whereby all of the parts of the flour are acted upon and reduced to a fine condition, the resulting mixture being of uniform consistency and free from lumps.

The apparatus by which the grinding is accomplished consists of an elongated tank or reservoir having revolving agitators or beaters at one end and a longitudinal partition in its middle, combined with guides co-operating with the said agitating devices, whereby they produce a current or circulation in the tank, the liquid flowing along one side thereof in one direction and returning in the other direction along the other side of the tank at the other side of the partition.

Figure 1 is a plan view of an apparatus for grinding or reducing flour in accordance with this invention; Fig. 2, a side elevation, on a smaller scale, of the apparatus for making paste.

The flour, together with the water or other liquid and other materials which are to form the paste, are thoroughly ground or mixed in the tank *a*, of oblong shape, having a longitudinal partition, *b*, extending for a portion of its length. The said tank is provided with beaters or agitating devices *c d*, mounted upon rotary shafts connected by gearing *c'*, Fig. 2, by which they are turned in opposite directions, as indicated by the arrows. The said agitators, when in rapid rotation, cause the solid materials or flour, which are gradually introduced from above through a suitable chute or guide, *m*, Fig. 2, to be thoroughly commingled with the liquid, and tend to throw the said liquid mixture outward by centrifugal force. The tank is provided with guides *e f*, the former extending from the side of the tank toward the axis of rotation of the nearest agitator, and the latter guides, *f*, being between the side wall of the tank and the partition *b*, and having a direction nearly the same as that of the said partition and side wall. By this arrangement the liquid, in its tendency to move outward from the axis of rotation of the agitators, will flow along between the guides *f* and the partition *b* and wall of the tank, as indicated by the arrows 4, while the guides *e* at the other side will prevent such outward flow of the liquid, but will tend to direct it between the said guides *e* and partition to the point where it is acted upon by both agitators, thus tending to draw the liquid inward toward the said agitators. By the counter-currents thus produced at the sides of the partition *b* the liquid will be kept in constant circulation, flowing along the tank at one side of the partition *b* in one direction and at the other side of the said partition in the other direction, as indicated by the arrows 5.

In operation, the flour being introduced gradually at a point near the agitators, the liquid in its constant flow repeatedly subjects the flour to the action of the said agitators until the flour becomes thoroughly ground up or reduced, and the resulting fluid mass is of uniform consistency and entirely free from lumps.

In order to prepare the paste for use, the liquid is drawn off from the tank *a* (see Fig. 2) into a boiler, *h*, in which it is boiled while being constantly stirred by revolving arms *i*. When properly cooked, the paste is ready for use, and may be drawn off from the boiler *h* into barrels or other receptacles.

The composition of the paste may be of any suitable or usual character, the main ingredients being flour and water.

I claim—

1. The combination, with a tank or receptacle and revolving stirrers or agitators therein adapted to rotate toward each other, of independent stationary guides co-operating with the said stirrers, as described, whereby the liquid mass is caused to flow toward the stirrers at one point and outward therefrom at another point, producing a constant circulation of the fluid, substantially as and for the purpose set forth.

2. The tank, and rotating stirrers at one end thereof arranged on vertical shafts and adapted to rotate toward each other, combined with a longitudinal partition, with one end near to and in a line drawn about midway between the spindles of the stirrers, and guides fixed to and extending obliquely from the side walls of the tank toward the stirrers at one side of the partition, to resist the outward flow of the material from the stirrers, said guides and partition together forming a throat leading to the said stirrers, through which the material passes to be repeatedly acted upon by the stirrers, substantially as described.

3. The elongated tank, and rotating stirrers at one end thereof arranged on vertical shafts and adapted to rotate toward each other, combined with a longitudinal partition, with one end near to and in a line drawn about midway between the spindles of the stirrers, and guides $e$, fixed to and extending obliquely from the side walls of the tank toward the stirrers at one side of the partition, and other guides, $f$, attached to the bottom of the tank, between the side walls of the tank and the partition at the other side thereof, substantially as and for the purpose specified.

In testimony whereof I have signed my name to this specification in the presence of two subscribing witnesses.

OLDIN NICHOLS.

Witnesses:
JOS. P. LIVERMORE,
W. H. SIGSTON.